US011823317B2

(12) United States Patent
Fenney

(10) Patent No.: US 11,823,317 B2
(45) Date of Patent: *Nov. 21, 2023

(54) SINGLE PASS RENDERING FOR HEAD MOUNTED DISPLAYS

(71) Applicant: Imagination Technologies Limited, Kings Langley (GB)

(72) Inventor: Simon Fenney, St. Albans (GB)

(73) Assignee: Imagination Technologies Limited, Kings Langley (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/081,496

(22) Filed: Oct. 27, 2020

(65) Prior Publication Data

US 2021/0042984 A1 Feb. 11, 2021

Related U.S. Application Data

(63) Continuation of application No. 15/998,389, filed on Aug. 15, 2018, now Pat. No. 10,853,988.

(30) Foreign Application Priority Data

Aug. 15, 2017 (GB) ...................................... 1713052
Apr. 5, 2018 (GB) ...................................... 1805677

(51) Int. Cl.
*G06T 7/11* (2017.01)
*G06T 15/00* (2011.01)
(Continued)

(52) U.S. Cl.
CPC .......... *G06T 15/005* (2013.01); *G02B 27/017* (2013.01); *G02B 27/0172* (2013.01);
(Continued)

(58) Field of Classification Search
CPC ....... G06T 15/005; G06T 7/11; G06T 3/0018; G06T 3/0093; G06T 15/00; G06T 15/205;
(Continued)

(56) References Cited

U.S. PATENT DOCUMENTS 5,319,744 A 6/1994 Kelly et al.
6,249,289 B1 6/2001 Arnaud et al.
(Continued)

FOREIGN PATENT DOCUMENTS

EP 0250588 B1 10/1991
WO 2014/095480 A1 6/2014
WO 2016/168913 A1 10/2016

OTHER PUBLICATIONS

Kojima et al., "A Development of Reflex HMD—HMD with Time Delay Compensation Capability," Proceedings of Int'l Symposium on Mixed Reality, Mar. 14, 2001, pp. 40-47.
(Continued)

*Primary Examiner* — Jin Ge
(74) *Attorney, Agent, or Firm* — Potomac Law Group, PLLC; Vincent M DeLuca

(57) ABSTRACT

A method of rendering geometry of a 3D scene for display on a non-standard projection display projects geometry of the 3D scene into a 2D projection plane, wherein image regions are defined in the projection plane, maps the geometry from the projection plane into an image space using transformations, wherein a respective transformation is defined for each image region, and renders the geometry in the image space to determine image values of an image to be displayed on the non-standard projection display. The transformations are configured for mapping the geometry into the image space so as to counteract distortion introduced by an optical arrangement of the non-standard projection display.

19 Claims, 9 Drawing Sheets

(51) Int. Cl.
    *G02B 27/01*     (2006.01)
    *G06T 3/00*     (2006.01)
    *H04N 13/344*     (2018.01)
    *G03B 21/14*     (2006.01)
    *G06T 15/20*     (2011.01)
    *G06T 11/00*     (2006.01)

(52) U.S. Cl.
    CPC .......... *G03B 21/147* (2013.01); *G06T 3/0018* (2013.01); *G06T 3/0093* (2013.01); *G06T 7/11* (2017.01); *G06T 15/00* (2013.01); *G06T 15/205* (2013.01); *H04N 13/344* (2018.05); *G02B 2027/014* (2013.01); *G06T 11/00* (2013.01)

(58) Field of Classification Search
    CPC .... G06T 11/00; H04N 13/344; G02B 27/017; G02B 27/0172; G03B 21/147; G02T 2027/014
    USPC .......................................................... 345/419
    See application file for complete search history.

(56)     References Cited

U.S. PATENT DOCUMENTS

| 10,395,349 | B1* | 8/2019 | Zhang ....................... G02F 1/29 |
|---|---|---|---|
| 2002/0063807 | A1 | 5/2002 | Margulis |
| 2008/0018732 | A1 | 1/2008 | Moller |
| 2013/0141593 | A1 | 6/2013 | Bassi et al. |
| 2014/0002587 | A1* | 1/2014 | Aguren ................ H04N 5/2254 348/36 |
| 2015/0187115 | A1* | 7/2015 | MacDonald ............ G06F 3/013 345/419 |
| 2015/0287158 | A1* | 10/2015 | Cerny ....................... G06T 1/60 345/553 |
| 2016/0091720 | A1* | 3/2016 | Stafford ............. G02B 27/0093 345/8 |
| 2016/0260247 | A1 | 9/2016 | Fursund et al. |
| 2016/0314564 | A1* | 10/2016 | Jones .................... G06T 3/0093 |
| 2017/0131765 | A1* | 5/2017 | Perek .................. G02B 5/3083 |
| 2017/0161951 | A1* | 6/2017 | Fix ..................... G06K 9/00604 |
| 2017/0193628 | A1 | 7/2017 | Sharma et al. |
| 2017/0193687 | A1* | 7/2017 | Lo .......................... G06T 5/006 |
| 2017/0206689 | A1* | 7/2017 | Eo .......................... H04N 9/646 |
| 2017/0329136 | A1* | 11/2017 | Bates ................. G02B 27/0093 |
| 2019/0051229 | A1 | 2/2019 | Ozguner et al. |

OTHER PUBLICATIONS

Radatz, "Tile," The IEEE Standard Dictionary of Electrical and Electronics Terms, Jan. 1, 1996, p. 1113.

Robinett et al., "The Visual Display Transformation for Virtual Reality," TR94-031, vol. 4, No. 1, Sep. 30, 1994, pp. 1-30.

* cited by examiner

SINGLE PASS RENDERING FOR HEAD MOUNTED DISPLAYS

CROSS-REFERENCE TO RELATED APPLICATIONS AND CLAIM OF PRIORITY

This application is a continuation under 35 U.S.C. 120 of copending application Ser. No. 15/998,389 filed Aug. 15, 2018, which claims foreign priority under 35 U.S.C. 119 from United Kingdom Application Nos. 1713052.7 filed Aug. 15, 2017 and 1805677.0 filed Apr. 5, 2018, the disclosures of which are hereby incorporated by reference herein.

BACKGROUND

Head mounted displays (HMDs) are wearable display devices which provide a display surface close to one or both of the wearer's eyes. They are typically used to provide an immersive virtual or augmented reality experience for the wearer. The closeness of the display surface to the wearer's eye(s) and/or the physical attachment of the display to the user's head introduce additional challenges compared to rendering graphics on a monitor or television screen which may be many centimetres (or further) from the viewer's eyes. For example, if the latency between the detection of head movement and displaying an updated rendered image corresponding to the new view direction is too large, it can result in the wearer experiencing motion sickness.

A second issue arises due to the desire to provide a wide field of view for each eye. To achieve this in a cost effective and ergonomic manner—and also to adjust the perceived focus depth distance of the image—a lens or system of lenses is typically placed between each eye and the display screen(s) of the HMD. This generally leads to requiring a 'distorted' image (i.e., distorted relative to that typically produced by a graphics rasterization system or even, say, a consumer camera), to be sent to the display. The lens undoes this distortion to produce the image seen by the eye.

The embodiments described below are provided by way of example only and are not limiting of implementations which solve any or all of the disadvantages of known graphics processing systems for head mounted displays.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of rendering geometry of a 3D scene for display on a non-standard projection display is described. The method comprises projecting geometry of the 3D scene into a 2D projection plane, wherein image regions are defined in the projection plane, mapping the geometry from the projection plane into an image space using transformations, wherein a respective transformation is defined for each image region, and rendering the geometry in the image space to determine image values of an image to be displayed on the non-standard projection display. The transformations are configured for mapping the geometry into the image space so as to counteract distortion introduced by an optical arrangement of the non-standard projection display.

The graphics processing unit described herein may be embodied in hardware on an integrated circuit. There may be provided a method of manufacturing, at an integrated circuit manufacturing system, a graphics processing unit and/or a graphics processing system comprising the graphics processing unit. There may be provided an integrated circuit definition dataset that, when processed in an integrated circuit manufacturing system, configures the system to manufacture a graphics processing unit and/or a graphics processing system comprising the graphics processing unit. There may be provided a non-transitory computer readable storage medium having stored thereon a computer readable description of a graphics processing unit and/or a graphics processing system comprising the graphics processing unit that, when processed, in an integrated circuit manufacturing system, causes the integrated circuit manufacturing system to manufacture an integrated circuit embodying a graphics processing unit and/or a graphics processing system comprising the graphics processing unit.

There may be provided an integrated circuit manufacturing system comprising: a non-transitory computer readable storage medium having stored thereon a computer readable description of the graphics processing unit and/or a graphics processing system comprising the graphics processing unit; a layout processing system configured to process the computer readable description so as to generate a circuit layout description of an integrated circuit embodying the graphics processing unit and/or a graphics processing system comprising the graphics processing unit; and an integrated circuit generation system configured to manufacture the graphics processing unit and/or a graphics processing system comprising the graphics processing unit according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
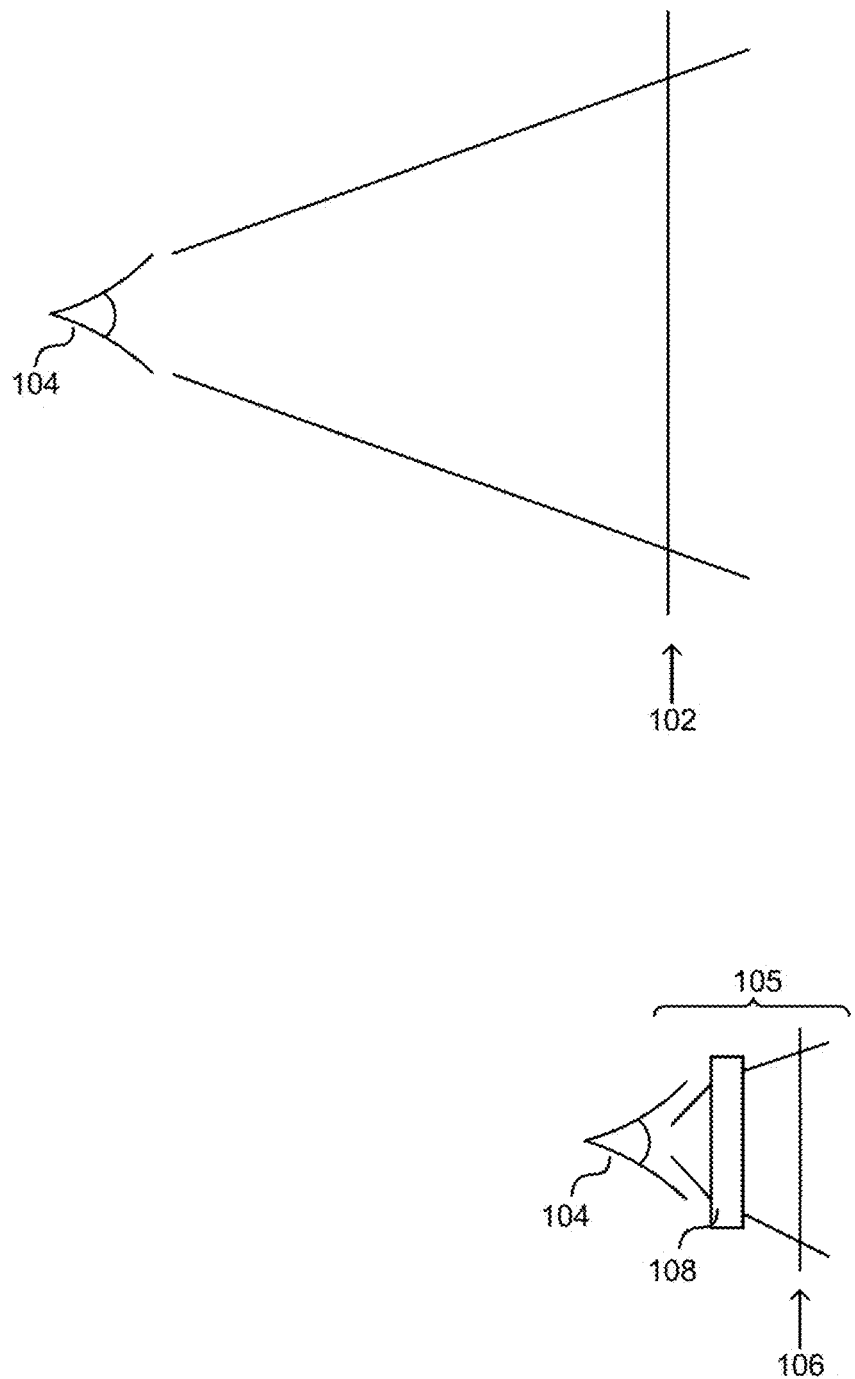
FIG. 1 is a schematic diagram showing the difference in projection of graphics between a standard, non-head mounted display and a head mounted display.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

FIG. 1 shows the difference in projection of graphics between a standard, non-head mounted display (e.g. a monitor, television, smartphone or tablet) and a head mounted display (HMD). With a standard, non-HMD display, the graphics are projected onto a display surface 102 which is distant from the viewer's eye 104 and is viewed directly by the viewer. In contrast, in a HMD 105, the display surface 106 is close to the viewer's eye 104 (e.g. less than 10 cm from the viewer's eye) and is viewed through an optical arrangement 108 which is part of the HMD 105 and comprises one or more lenses. The optical arrangement 108 can distort the viewed image so that it appears, to the wearer of the HMD, to fill a significant proportion (if not all) of their field of view, even though the display surface 106 may be planar and in some examples, is relatively small (compared to the size of the wearer's head).

Figure 2:
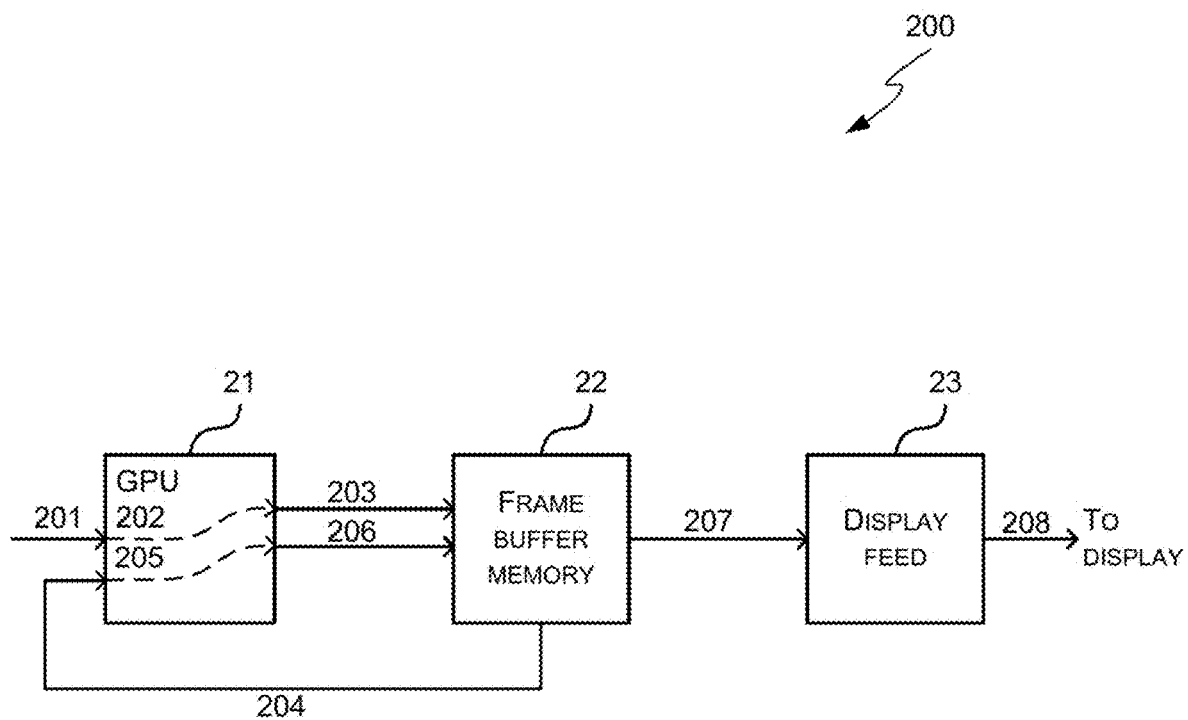
FIG. 2 is a schematic diagram of a graphics processing system for a head mounted display.
Figure 3A:
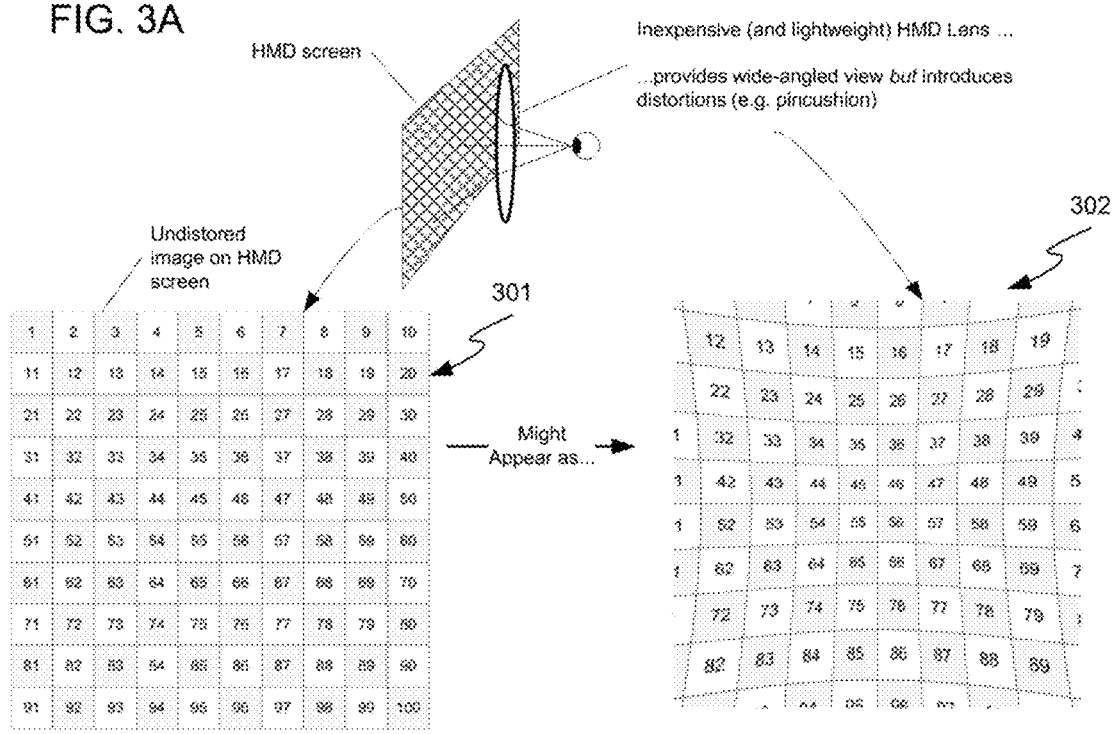
FIGS. 3A and 3B shows a graphical representation of the rendering process in the graphics processing system shown in FIG. 2.
Figure 3B:
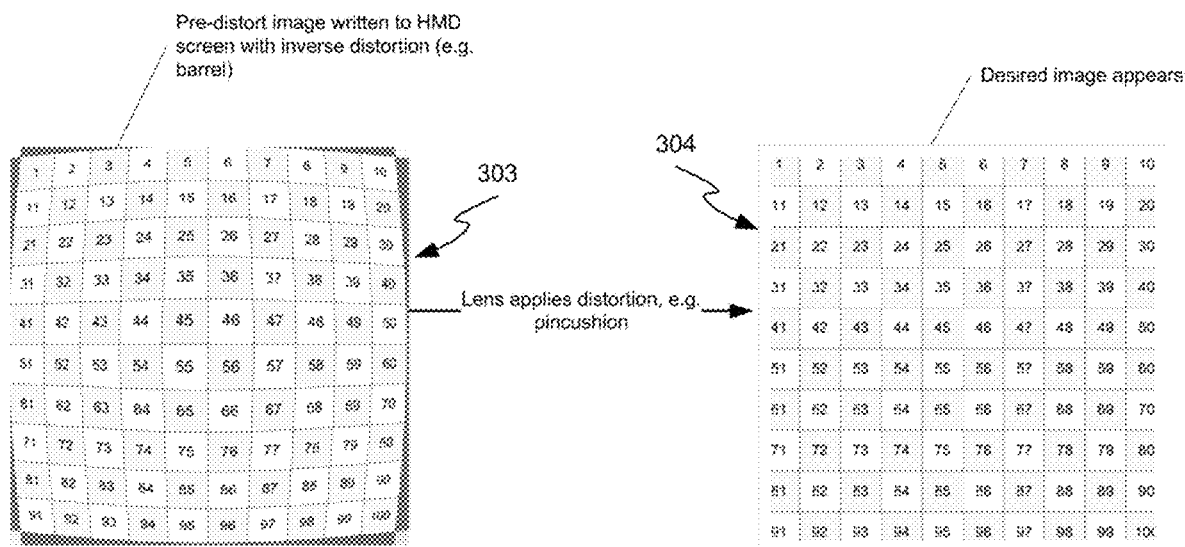

In order that the image appears correctly when viewed though the optical arrangement 108 of the HMD (e.g. such that the image provides a wide angled view), the projected image (which may also be referred to as the displayed image) is pre-distorted as part of the rendering operation and this may be implemented in a second rendering pass performed by a graphics processing unit (GPU), as can be described with reference to FIG. 2 (which shows a graphics processing system 200) and FIGS. 3A and 3B (which shows a graphical representation of the rendering process). As shown in FIG. 2, data is received by a GPU 21 (arrow 201) is rendered in a first pass (arrow 202) with a standard projection, e.g. such that the rendered scene is suitable for display on a standard, non-HMD display (e.g. the scene is rendered onto surface 102), and the output is stored in frame buffer memory 22 (arrow 203). FIG. 3A shows a graphical representation of the result 301 of this first pass render in the GPU 21 and comprises a regular grid of regions of pixels (numbered 1-100 in the example shown). A second pass render is then performed by the GPU (arrow 205) using the data from the first pass which is read from the frame buffer memory 22 (arrow 204) and this second pass applies distortion and the distorted result 303 is shown graphically in FIG. 3B. The pixel values of the distorted result 303 can be determined by sampling the intermediate framebuffer data 301 and filtering (e.g. interpolating) between the sampled pixel values. In the example shown in FIG. 3B, the distortion used is a barrel distortion (and hence the second pass result 303 is a barrel distorted image) and when viewed through the optical arrangement 108 of the HMD, it appears undistorted 304. The output of the second pass render is stored in frame buffer memory 22 (arrow 206). A display feed 23 (which may, for example, be implemented as a DAC) reads data out of the frame buffer memory 22 (arrow 207) and outputs it to the display (arrow 208). If the results of the first pass 301 were displayed on the display and viewed by the wearer of the HMD, the optical arrangement 108 in the HMD would produce a wide angle result 302, as shown graphically in FIG. 3A. The effect illustrated in FIG. 3A may be referred to as a "pincushion effect". However, when the distorted result 303 is displayed on the display and viewed by the wearer of the HMD, the combination of the distortion (applied in the second pass render 205) and the optical arrangement 108 in the HMD produces an undistorted result 304, as shown in FIG. 3B. As well as introducing distortion, the second pass render (arrow 205) may also introduce some motion compensation (which may be required due to the additional latency incurred by a two pass approach).

The rendering approach shown in FIG. 2 and described above may be described as a brute force approach to the rendering process because it uses the GPU 21, which is a powerful processing device, to perform both rendering passes. However, by using two passes, the GPU resources are occupied for longer in order to render a single frame and so the efficiency of the graphics processing system is reduced. Further, the second pass, due to its sampling and, (likely performance-constrained and thus simple) filtering of the intermediate framebuffer data 301, is likely to introduce additional unwanted image degradation such as blurring or aliasing.

The term 'standard projection' is used herein to refer to the rendering of pixel data for display on a standard, planar, non-HMD display, such that the pixels are arranged on a regular (x,y)-grid without any distortion (e.g. as shown in example 301 in FIG. 3A), e.g. a pin-hole camera-rendered image. In standard projection, straight lines in world space project to straight lines in the view.

Described herein is a reduced latency method of rendering a distorted image for a HMD or other non-standard projection display. The method results in geometric distortion (which may also be described as lens compensating distortion) being automatically introduced within a single render pass on the GPU. This reduces the latency (because a second render pass is not performed) and increases the efficiency because a) the GPU can be processing the next frame of pixel data instead of performing the second render pass and b) eliminates the additional write and read of the intermediate frame buffer. Where the GPU uses a tile-based rendering technique, the method described herein may be considered to be a modified tile-based rendering method; however, as described below, the methods described herein may also be used in GPUs which use immediate mode rendering.

In the modified tile-based rendering method described herein, the rendering is performed with piecewise linearly changing coordinate spaces (e.g. per tile) such that the resulting pixels written to the framebuffer are a very close approximation to the desired distorted result 303. In various examples, each tile contains the same number of pixels (e.g. 32×32 pixels) and these subdivide the display into a regular grid; however in other examples, tiles may contain differing numbers of pixels and/or have differing sizes and/or shapes. The mapping (e.g. the linear transformation or transformations) from world space to each tile, or each subset of a tile, however typically varies from tile to tile. These mappings are chosen so as to closely match the geometric distortions that would result from the second pass result 303 in FIG. 2 without requiring the second pass render in the GPU and without requiring significant extra hardware. Although the tiles may have the same size in terms of output pixels, their footprint in the projection plane (which may alternatively be referred to as the camera projection plane or virtual projection plane) will differ. When the distorted result image (which is similar to result 303 shown in FIG. 3B) is displayed on the display and viewed by the wearer of the HMD, the combination of the distortion (introduced as a consequence of the differing tile transformations) and the optical arrangement in the HMD produces a wide angle image (e.g. as shown graphically in FIG. 3B).

Figure 4:
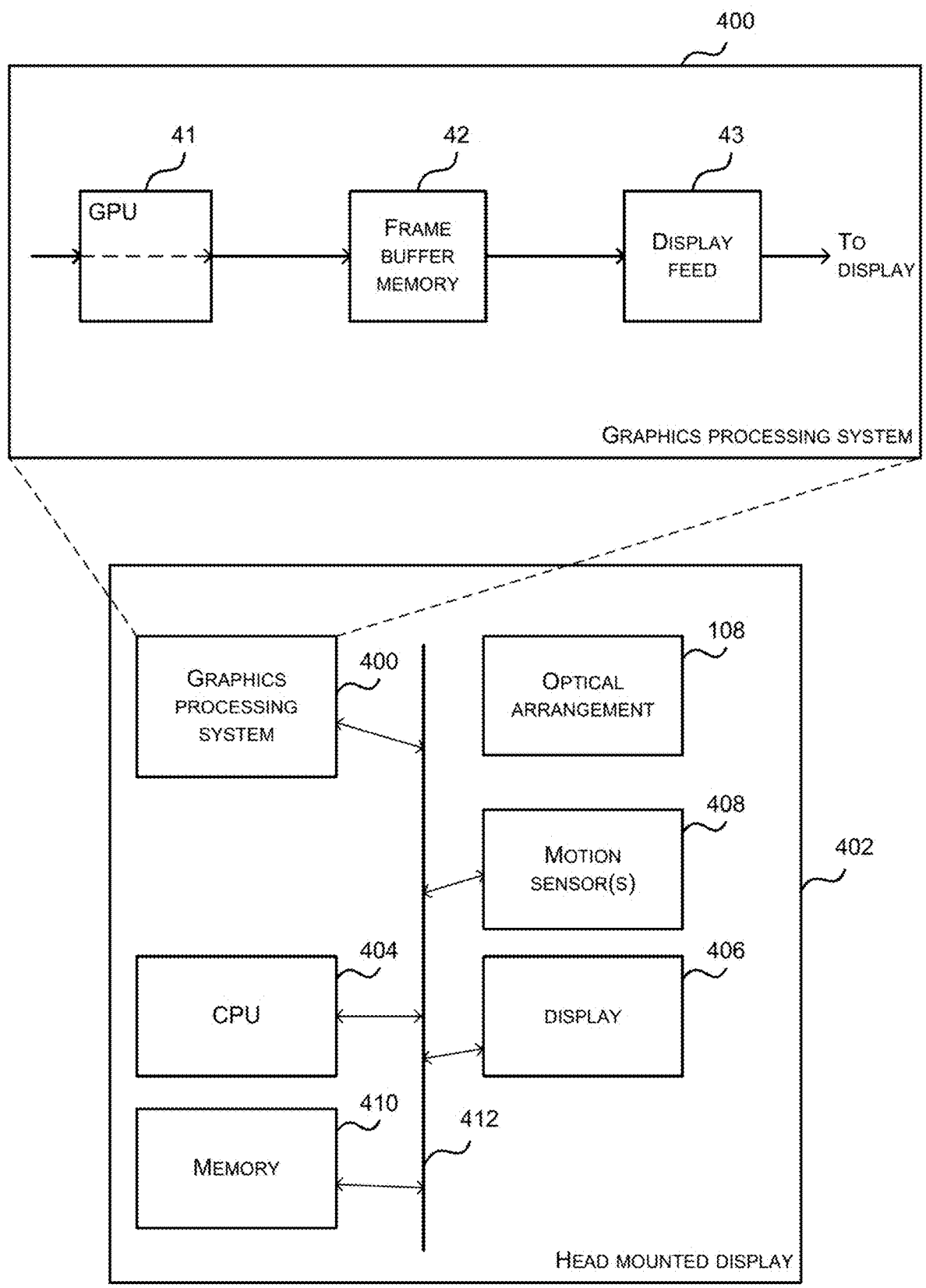
FIG. 4 shows schematic diagrams a graphics processing system and a head mounted display.

The modified tile-based rendering method described herein may be implemented in a graphics processing system 400 as shown in FIG. 4. The graphics processing system 400 comprises a GPU 41, a frame buffer memory 42 and a display feed 43. The GPU 41 performs the modified tile-based rendering method described herein and the pixel data which is generated by the GPU 41 is stored in the frame buffer memory 42. The display feed 43 reads data out of the frame buffer memory 42 and outputs it to a display. The graphics processing system 400 may be implemented within a head mounted display 402. The HMD 402 additionally comprises a CPU 404, a display 406 (on which the distorted image is displayed), one or more motion sensors 408 (to detect motion of the user's head), a memory 410 and an optical arrangement 108 (e.g. one or more lenses, through which the wearer views the displayed, distorted image). The display feed 43 shown in the graphics processing systems 400 in FIG. 4 may be part of a display controller (or display pipeline). The HMD 402 may also comprise other devices not shown in FIG. 4, such as inputs (e.g. hand controllers, body tracking sensors and other position sensors, GPS sensors, etc.), outputs, speakers and/or a camera. The electronic components of the HMD may communicate with each other via a communications bus 412. Parameters used by GPU 41 to perform the mapping between coordinate spaces may be stored in the memory 410.

Figure 5:
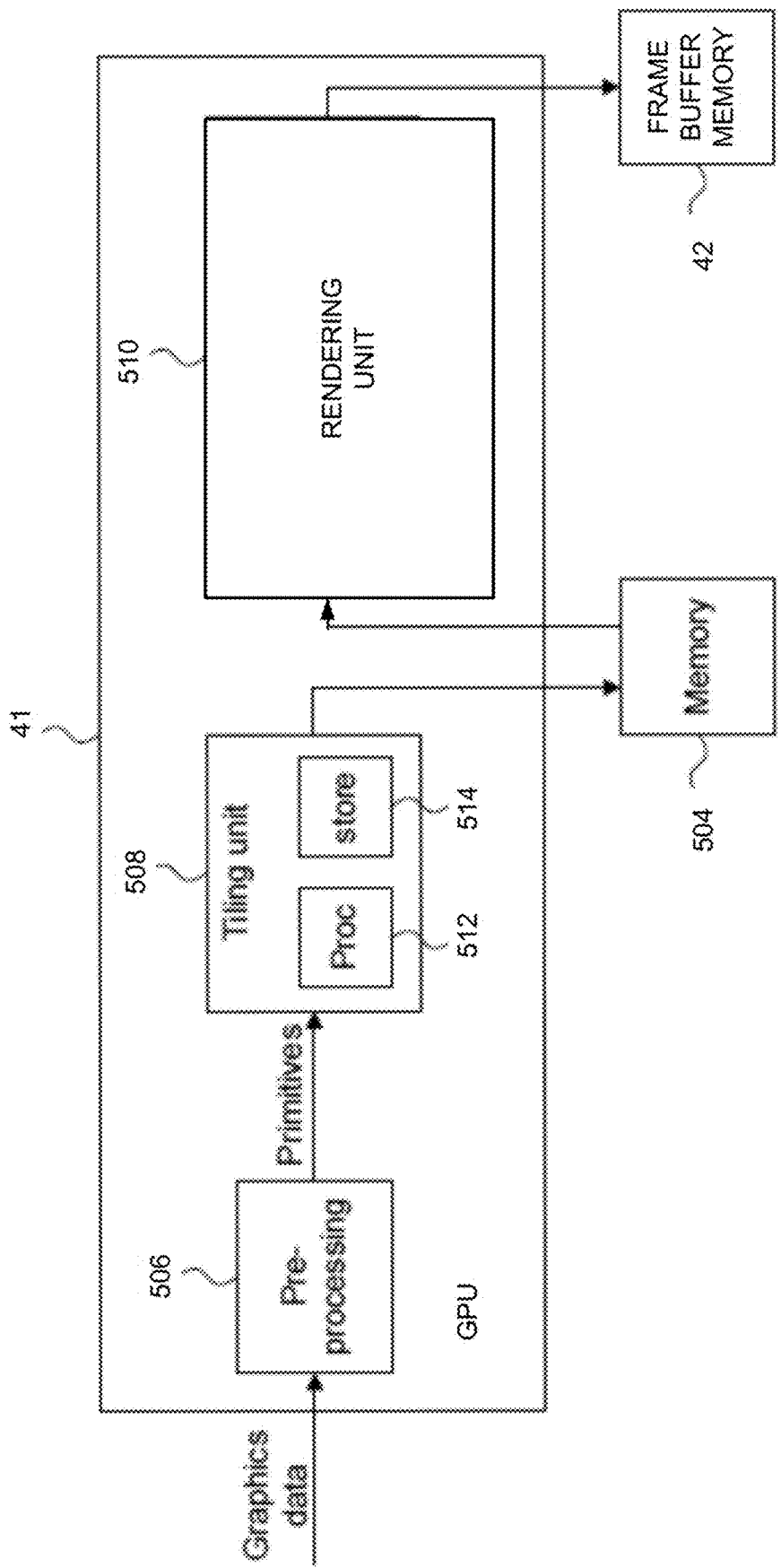
FIG. 5 is a schematic diagram of the graphics processing unit shown in the graphics processing system in FIG. 4.

FIG. 5 is a schematic diagram showing the GPU 41 in more detail. As shown in FIG. 5, the GPU 41 utilises a portion of memory 504 which may be part of the memory 410 shown in FIG. 4 or a separate memory element (not shown in FIG. 4). The GPU 41 comprises a pre-processing module 506, a tiling unit 508 and a rendering unit 510. The tiling unit 508 comprises processing logic 512 and a data store 514. The graphics processing system 400 (and the GPU 41 in particular) is arranged such that graphics data describing a sequence of primitives provided by an application is received at the pre-processing module 506. The pre-processing module 506 performs functions such as geometry processing including clipping and culling to remove primitives which do not fall into a visible view. The pre-processing module 506 may also project the primitives into screen-space. The pre-processing module 506 outputs primitives to the tiling unit 508.

The tiling unit 508 receives the primitives from the pre-processing module 506 and determines which of the primitives are present within each of the tiles of the rendering space of the graphics processing system 400. A primitive may be in one or more of the tiles of the rendering space. The tiling unit 508 assigns primitives to tiles of the rendering space by creating display lists for the tiles, wherein the display list for a tile includes indications of primitives (i.e. primitive IDs) which are present in the tile. The display lists and the primitives are outputted from the tiling unit 508 and stored in the memory 504. The rendering unit 510 fetches the display list for a tile and the primitives relevant to that tile from the memory 504, and performs texturing and/or shading on the primitives to determine pixel colour values of a rendered image which can be passed to the frame buffer memory 42. Depending upon the implementation, the rendering unit 510 may perform hidden surface removal (HSR), which removes fragments of primitives which are hidden in the scene, before texturing and/or shading or the test for hidden primitives (or parts thereof), which may also be referred to as a 'Z test', may be performed after texturing and/or shading. Graphics processing systems which perform HSR on a primitive fragment prior to performing texturing and/or shading on the primitive fragment in order to render the scene may be referred to as 'deferred rendering systems'; whilst graphics processing system which perform HSR on a primitive fragment after performing texturing and/or shading on the primitive fragment in order to render the scene may be referred to as 'immediate mode rendering systems'.

The rendering unit 510 processes primitives in each of the tiles and when the whole image has been rendered and stored in the frame buffer memory 42, the image can be output from the graphics processing system 400 and displayed on the display 406 (e.g. data is read out of the frame buffer memory 42 by the display feed 43 and output to the display 406).

Figure 6:
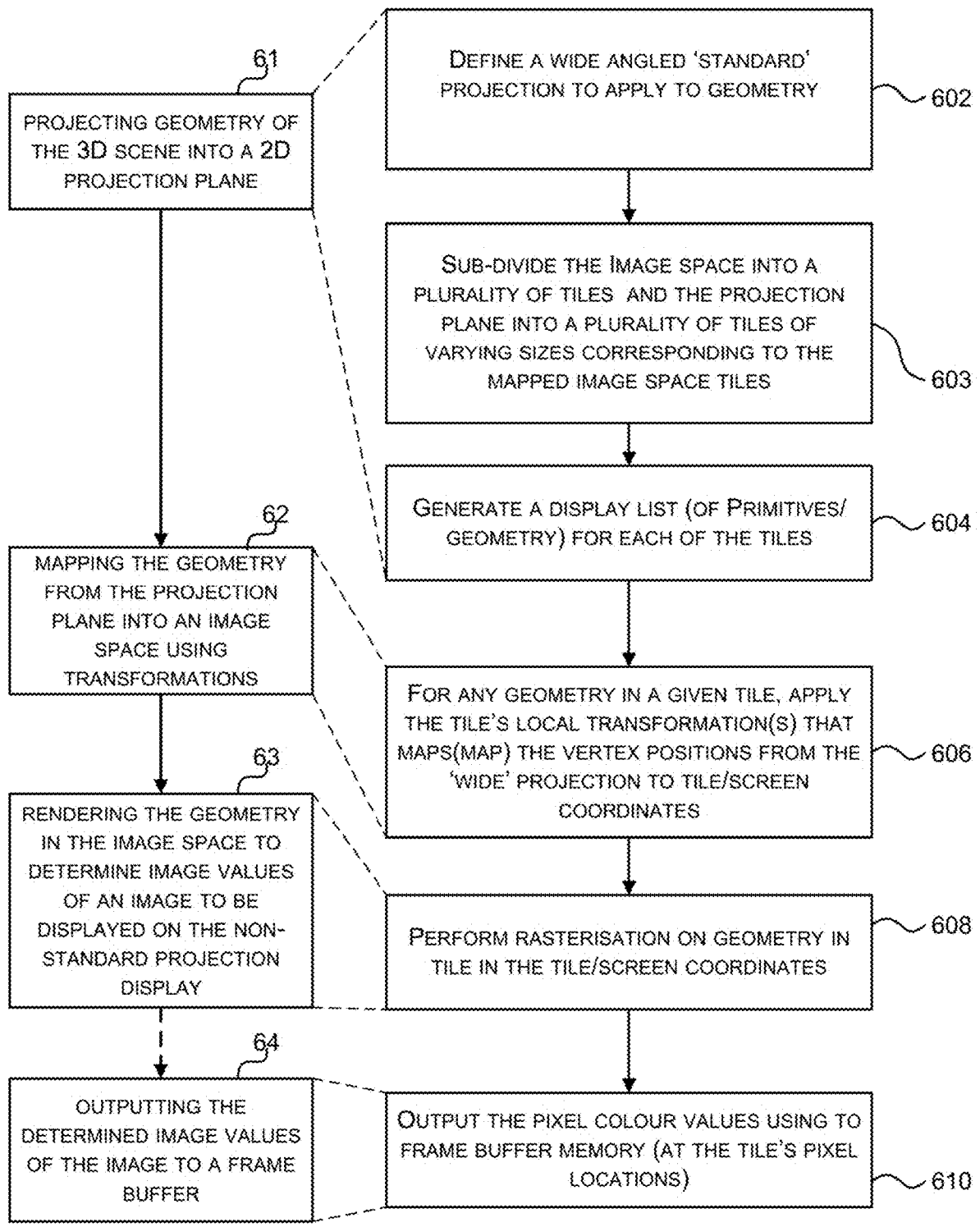
FIG. 6 is a flow diagram of a modified method of tile-based rendering which may be implemented by the graphics processing unit shown in FIG. 5.

FIG. 6 is a flow diagram showing the modified tile-based rendering method which may be implemented in the graphics processing system 400 shown in FIGS. 4 and 5. The method comprises the standard geometric processing and lighting process steps, such as occur in the first GPU pass 202 in known systems, but additionally comprises projecting the scene according to a virtual wide angle view, determining the mapping distortion required for the given display and then performing a modified tiling or binning process and an adapted rendering process. The method is described in more detail below with reference to FIGS. 7A and 7B.

The modified tile-based rendering method shown in FIG. 6, comprises: projecting geometry of the 3D scene into a 2D projection plane, wherein image regions are defined in the projection plane (block 61), mapping the geometry from the projection plane into an image space using transformations, wherein a respective transformation is defined for each image region (block 62); and rendering the geometry in the image space to determine image values of an image to be displayed on the non-standard projection display (block 63), wherein the transformations are configured for mapping the geometry into the image space so as to counteract distortion introduced by an optical arrangement of the non-standard projection display. The method may further comprise outputting the determined image values of the image to a frame buffer (block 64).

Figure 7A:
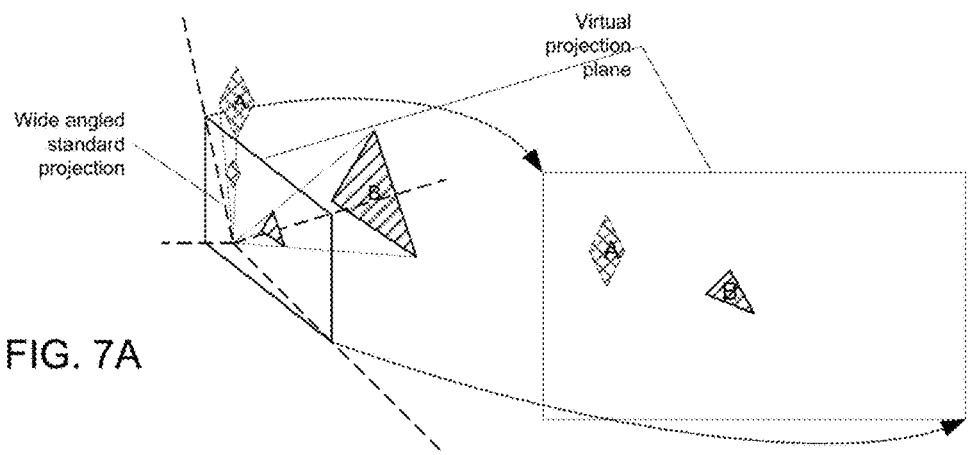
FIGS. 7A-7F show graphical representations of the rendering process according to the method of FIG. 6.
Figure 7F:
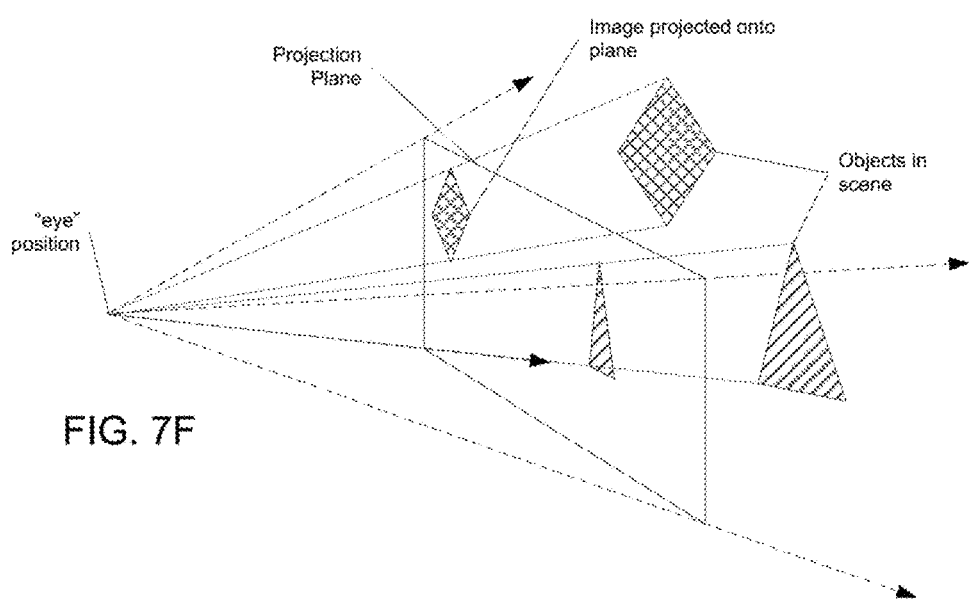
Figure 7B:
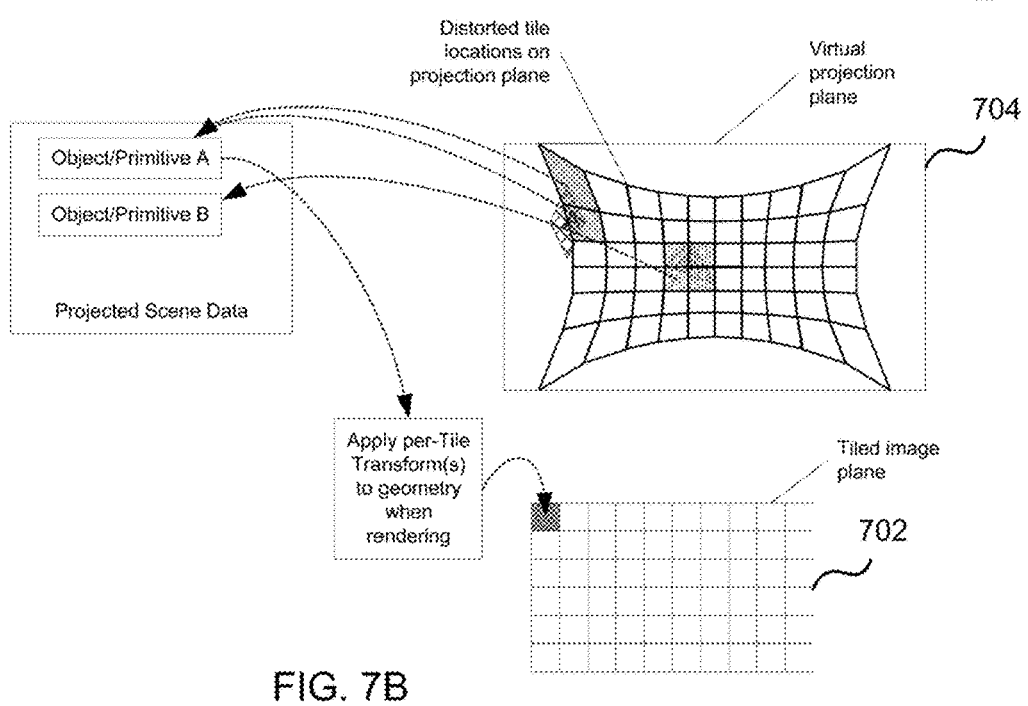

As shown in FIG. 6, projecting the geometry (in block 61) may, for example include defining a wide-angled standard projection to apply to the geometry (block 602) e.g. to primitives (where the term 'standard' refers to the fact that the projection is similar to a pinhole lens or rectilinear lens). Two examples of this projection are shown graphically in FIGS. 7A and 7F with the example shown in FIG. 7A being a more wide-angled example than that shown in FIG. 7F. The image space (or display space) 702 is divided into a plurality of tiles (block 603) and in various examples and as shown in FIG. 7B, all the tiles in the plurality of tiles in the image space 702 are the same size and shape (e.g. 32×32 or 32×16 pixels). In other examples, however, the tiles in the image space 702 may be of differing shapes and/or sizes. The projection plane (or virtual projection plane) 704 is however, not divided into equal shape or size tiles (as shown in FIG. 7B). The shape and size of the tiles in the projection plane is determined based on a mapping distortion between the image space 702 and the projection space 704. As described above, the mapping distortion is defined so as to closely match the geometric distortions that are needed so that the image appears correctly (e.g. undistorted) when viewed through the optical arrangement of the HMD.

Figure 7C:
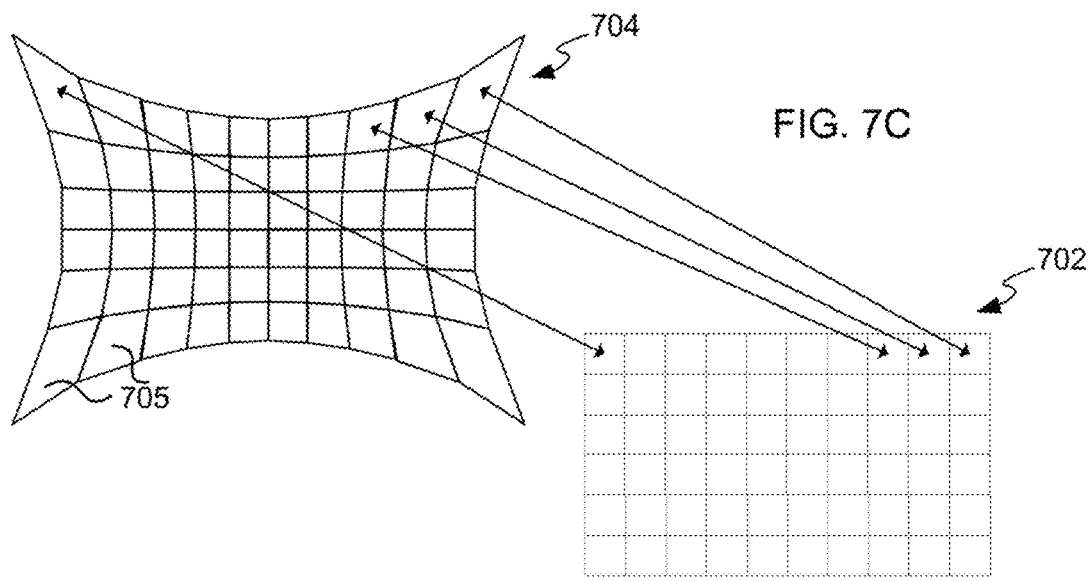

Both the image space 702 and the projection plane 704 are sub-divided into the same number of tiles and there is a one to one correspondence between tiles in the image space and tiles in the projection plane (as shown in FIG. 7C).

As part of the sub-division of both the image space and the projection space (in block 603), the boundaries of the image tiles in the projection plane 704 are determined by applying the inverse of the mapping distortion. One or more local linear transformations (as indicated by the arrows in FIG. 7C) are also defined for each tile. Each linear transformation defines how geometry within the tile, or a part of the tile, is modified (e.g. distorted) between the image space 702 and the projection plane 704 and is based on the mapping distortion described above. In the example shown in FIG. 7C, all the tiles are the same size; however, in the example shown in FIG. 7D, the tiles in the image plane are not all the same size.

Figure 7D:
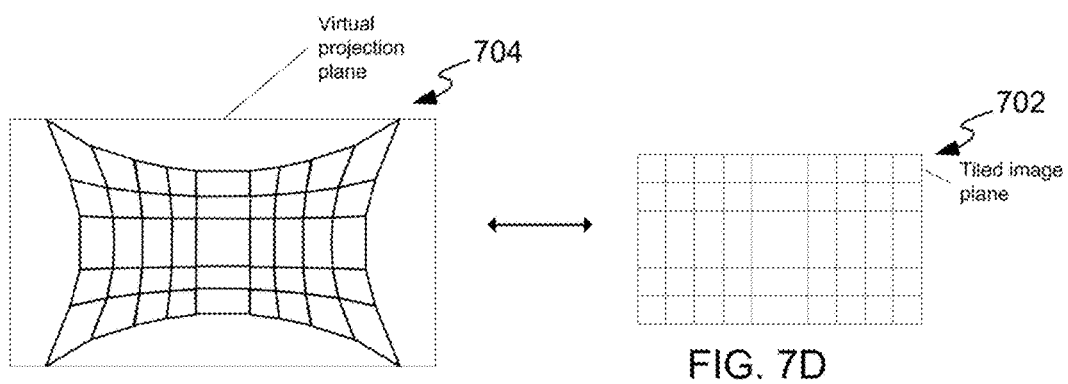
Figure 7E:
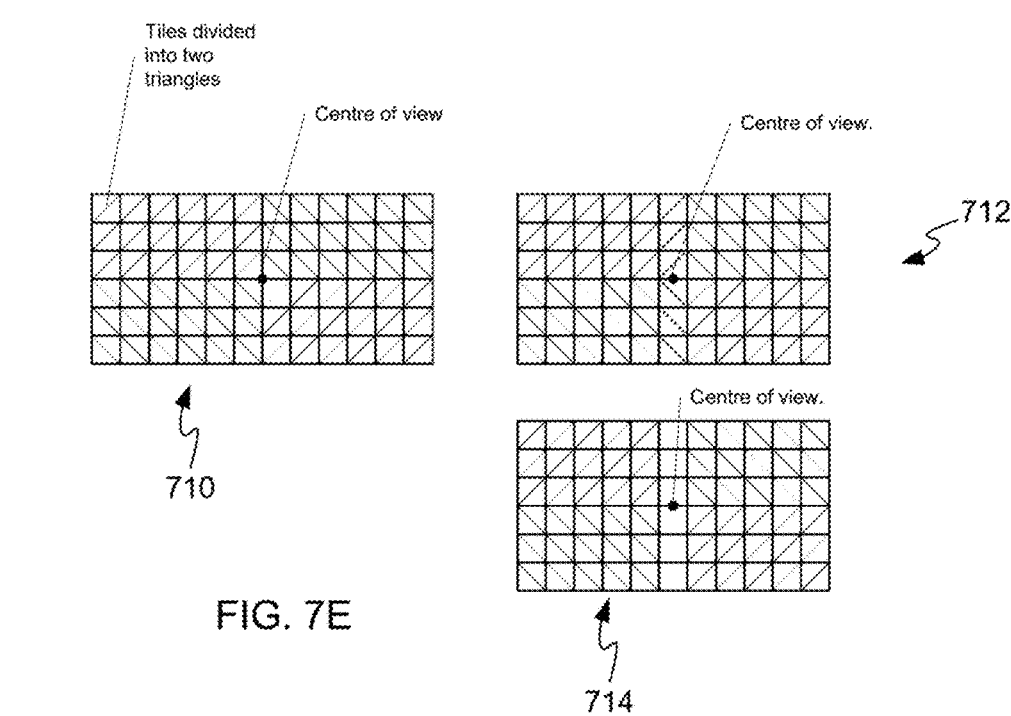

In the example shown in FIG. 7C there is a single linear transformation which is defined per tile (as represented by the single arrow between a tile in the image space 702 and the corresponding tile in the projection plane 704), such that the distortion that is applied is the same for all pixels within the tile. The examples shown in FIG. 7E, however, sub-divide one or more of the tiles, such that there are multiple different linear transformations (e.g. two different linear transformations) and each linear transformation relates to a part of the tile (e.g. to half the tile). As shown in FIG. 7E, in some examples all of the tiles may be sub-divided (e.g. example 710, where there is an even number of tiles in a horizontal direction and a symmetrical distortion is used). In other examples, there may some tiles which are not sub-divided (e.g. examples 712, 714, where there is an odd number of tiles in a horizontal direction), for example, because the distortion is effectively planar in those tiles (e.g. due to symmetry) and/or not all tiles may be sub-divided in the same way.

Having determined the boundaries of these image tiles in the virtual projection plane (in block 603), the method further comprises determining if the projection of a primitives intersects (or is likely to intersect) each inverse distorted tile 705 (i.e. each tile in the projection plane 704) and forming, for each tile, a display list (or equivalent thereof) indicating which primitives should be considered when rendering the given tile (block 604). The primitives may be stored with vertex coordinates specified in the coordinate space of the virtual wide angle view (or virtual wide angled projection) allowing the same data to be referenced by any of the tiles, e.g. at least three (x,y,depth) coordinates. As described above, a primitive may be in (e.g. may overlap) one or more of the tiles of the projection space 704 and the display list for a tile (which may alternatively be referred to as a control list or control stream) includes indications of primitives (i.e. primitive IDs) which are present in the tile. The display lists and the primitives are output from the tiling unit 508 and stored in the memory 504.

The determination of which primitives lie inside which distorted tiles on the virtual projection plane (in block 604) may be performed in multiple ways: a first example is to compute the axis aligned bounding box of the distorted tile, by considering the maximums and minimums of the corners of the distorted box, and performing a 'perfect tiling' approach, e.g. as described in UK patent number GB2401522. This is slightly conservative in that the bounding box may be slightly larger than the original distorted tile but, in the majority of cases a) the increase in size will be very minor and b) the probability of this increase in size causing unnecessary primitives to be included in the list is tiny. A second example approach, which is not conservative, is to consider the distorted tile as a convex quadrilateral and use a test for intersection of convex objects, such as the method of separating axes, which is known in the art.

Having generated the display lists (in block 604), the adapted rendering process processes tiles in an approximately similar manner to prior art tiled (deferred or non-deferred) systems (e.g. in blocks 63-64 or 608-610) except for the manner in which the geometry is processed. As shown in FIG. 6, each tile has one or more associated linear matrix transforms (e.g. one in the example of FIG. 7C and two in the example of FIG. 7E) that takes geometry specified (and stored) in the coordinate space of the virtual projection plane and maps into in a local space for the tile (as generated in block 603 and as indicated by the arrows in FIG. 7C) so that, for pixels within the tile, the transformed geometry closely matches the required distortion. These linear transformations are applied to any geometry in a given tile (block 62 or 606) prior to rasterization, e.g. to transform elements A and B shown in FIG. 7A. to the screen coordinates of the tile.

The per-tile (or per-half-tile, or more generically, per-tile-portion) linear transformation need only be applied to the X and Y coordinates (in the virtual projection plane) of the geometry's vertices, e.g., for a given tile (or half-tile or tile-portion), the following matrix multiplication may be performed on the vertex coordinates $[X_{vpp}, Y_{vpp}]^T$ of geometry expressed in the virtual projection plane 704 in order to determine the corresponding vertex coordinates $[X_{tile\_distorted}, Y_{tile\_distorted}]^T$ in the display space 702:

$$\begin{bmatrix} A_{00} & A_{01} & A_{02} \\ A_{10} & A_{11} & A_{12} \\ 0 & 0 & 1 \end{bmatrix} \cdot \begin{bmatrix} X_{vpp} \\ Y_{vpp} \\ 1 \end{bmatrix} = \begin{bmatrix} X_{tile\_distorted} \\ Y_{tile\_distorted} \\ 1 \end{bmatrix}$$

wherein the six "A" values define the linear transformation performing the geometric distortion for the tile (or half-tile or tile-portion) to produce distorted geometry. The other vertex attributes, e.g. projected Z, inverse W, texture coordinates, colours etc, do not need modification. There is a respective matrix of A values defined for each region to be transformed (e.g. for each tile, half tile or tile portion). The A values of the matrix for each tile (or more generally tile portion) may be stored in a memory (e.g. in a look up table (LUT)), such as in memory 410 or in the GPU 41. Storing the A values in a memory, e.g. in a LUT, means that the GPU can be adapted by loading different A values into the memory to adjust the distortion applied, e.g. to suit different optical arrangements. Alternatively, the A values of the matrix for each tile (or more generally, for each tile portion) may be hardcoded into fixed function circuitry which performs the transformation if the transformation that is needed is known at design time (e.g. if the optical arrangement of the HMD is known when designing the GPU).

In an alternative approach, per tile-portion lists of fully transformed geometry could be stored. This has the advantage of removing the need of performing the per-tile-portion transformation as the data is read by the rendering system, but has the disadvantage that geometry that is present in multiple tile-portions will be stored multiple times.

Using a single transform per tile approach (as shown in FIG. 7C) results in fewer computations than using multiple linear transforms per tile (as shown in FIG. 7E), for example a primitive which is present in multiple regions requires respective multiple computations to be performed; however, this may produce some visible discontinuities if the piecewise distortion is too great. For this reason various examples may use two (or more) different linear transforms per tile with each linear transformation applying to geometry within a separate, non-overlapping portion (e.g. half) of the tile. The use of multiple linear transforms per tile reduces or removes the geometric discontinuities at the cost of additional transformation operations; however since the transformation process only requires 4 multiplies and 4 additions per vertex, this is not expensive in terms of additional computation.

In various examples and as shown in FIG. 7C, each tile in the display space 702 is the same size and shape whereas in the projection plane (which may also be referred to as the rendering space) 704, the tiles are of different sizes and/or shapes. In other examples, however, the tiles in the display space 702 may be of differing sizes and/or shapes, as shown in FIG. 7D. For example, in the barrel distortion example, the centre regions of the image are less distorted than the outer and so larger tiles could be used in the centre rows and columns (compared to the tiles used towards the edges of the image) as illustrated in FIG. 7D thus reducing the number of transformations required without introducing significant geometric discontinuities at the tile boundaries. In various examples, including the examples shown in FIGS. 7C and 7D, the corners of tiles are shared to avoid discontinuity problems.

It is the difference in the tile size and/or shape between the projection space 704 and the display space 702 (e.g. the stretching and/or compression of tiles in the projection space 704 compared to the display space 702) that results in the automatic introduction of distortion within a single render pass on the GPU and whilst FIGS. 7A-7E show one example of the way that the tiles in the projection space 704 can be distorted compared to the tiles in the display space 702, in other examples, the tiles in the projection space 704 may be distorted (when compared to the tiles in the display space 702) in a different manner.

Furthermore, whilst in the examples shown in FIGS. 7A-F, the distortion that is introduced is different in the vertical (y) direction and horizontal (x) directions, in other examples, the different directions may have the same distortions. The distortion which is used when sub-dividing the projection space 704 (in block 603) is dependent upon the properties of the optical arrangement 108 in the HMD 402, such that a wearer of the HMD 402 sees an (approximately) undistorted wide-angle image when viewing the image on the display 406 through the optical arrangement 108.

The number of tiles into which the projection and display spaces 704, 702 are sub-divided (in block 603) may be the same as would have been used in the two render pass method (as described above with reference to FIG. 2). In other examples, however, the projection and display spaces 704, 702 may be sub-divided into a larger number of tiles (i.e. such that the average tile size is smaller) and this reduces any distortion which may be introduced by the piecewise linear approximation of the stretching/compression of tiles in the modified tile-based rendering method described herein.

Having applied the transforms (in block 606), the distorted geometry in the tile is rasterized (block 608) e.g. in the rendering unit 510 shown in FIG. 5.

The application of transforms (in block 606) may be described as a conversion between coordinate systems, e.g. between projection space coordinates (e.g. x,y coordinates in the projection space 704) and display space coordinates (e.g. x,y coordinates in the display space 702).

The transformations (in block 606) may, for example, the matrix multiplications and the six "A" values define the linear transformation and may be referred to as scaling and offset factors. There may be cases where some of the factors (i.e. some of the A values) are zero and, in those cases, appropriate savings may be made by elimination of redundant calculations. For example, if $A_{01}=A_{10}=0$, then there are two scaling factors for each tile (one for the x-axis, $S_g^x$ ($=A_{00}$), and one for the y-axis, $S_g^y(=A_{11})$). In some other examples, there may be a single scaling factor, $S_g$, (i.e. in such examples $S_g^x=S_g^ym$ or in other terms $A_{00}=A_{11}$ and $A_{01}=A_{10}=0$), where g is the tile ID or index and these scaling factors may, for example, be stored in memory 410 or another memory element. The offset factors are given by the $A_{02}$ and $A_{12}$ values.

In various examples where the matrix multiplication (described above) is not used (in block 606), the following two equations may instead be used to perform the conversion of the pixel coordinates (in block 606):

$$x_r=x_d S_g^x x_0$$

$$y_r=y_d S_g^y + y_0$$

where $(x_r, y_r)$ are the coordinates of a pixel in the projection space 704, $(x_d, y_d)$ are the coordinates of a pixel in the display space 702 and $x_0$ and $y_0$ are scaling constants (which may be zero). This provides an example in which the tiles in the projection space 704 are linearly stretched/compressed compared to the tiles in the display space 702.

In addition to applying the per-tile, or per-tile-portion, transformations (in block 606), in various examples an additional global transformation may additionally be applied at this stage, e.g. by combining the global transformation with each of the per-tile or per-tile-portion transformations before they are applied. This global transformation may be used to introduce "late" motion compensation (e.g. compensation for the eventuality when the user's head has moved in the time taken to render the geometry) and by rendering a bigger field of view than can be displayed, the global transformation may adjust the portion that is actually displayed based on an updated view direction which is input to rendering unit 510. Additionally, the tiling operation (i.e. determining which objects, such as shown in FIGS. 7A, 7F and 7B) cross which distorted locations (in the projection plane 704) is implemented in a conservative manner, e.g. by expanding the size of the distorted tiles.

Although in the method above, the tiling unit 508 in the GPU 41 generates display lists comprising one or more primitive identifiers for primitives which are present in the tile, in other examples, the tiling unit 508 may output data which is in a different form but which can be used to indicate which of the tiles a primitive is in. For example, for each primitive a list of tile IDs may be generated and stored with the list indicating the tiles in which the primitive is present.

By using the modified tile-based rendering method as described herein, the overall efficiency of the graphics processing system is improved and the latency of the rendering process is reduced without requiring significant additional hardware (e.g. small modifications may be implemented in the tiling unit and rendering unit) or adding any new vertices into the calculations (e.g. no new primitive vertices and no new tile vertices). Furthermore, there is a reduction in the amount of data which is written to the frame buffer memory 42 (as can be clearly seen from a comparison of FIGS. 2 and 4) because the GPU 41 does not write the same frame of pixel data to the frame buffer memory twice and there is much less traffic on the memory bus, resulting in a power saving. Additionally, by using the method described herein instead of two passes through the GPU, the image quality is improved, e.g. because the second pass through the GPU applies filters to perform the distortion and these will over filter the image in some regions and/or under filter the image in other regions and furthermore, by using the method described herein the actual rendered resolution more closely matches the desired resolution in any part of the screen (rather than having too little or too much resolution in parts of the display, which impacts image quality and/or efficiency).

The graphics processing system 400 in FIG. 4 and the GPU 41 in FIG. 5 are shown as comprising a number of functional blocks. This is schematic only and is not intended to define a strict division between different logic elements of such entities. Each functional block may be provided in any suitable manner. It is to be understood that intermediate values described herein as being formed by the GPU 41 need not be physically generated by the GPU 41 at any point and may merely represent logical values which conveniently describe the processing performed by the GPU 41 between its input and output.

Although the method has been described above with reference to a tile-based renderer, it is also feasible to adopt the method to a more traditional "immediate-mode" renderer. In such a system, each incoming polygon is transformed, as before, into the virtual projection plane coordinates. As each polygon is processed a set of pixels (e.g. a scanline span or a rectangular tile) at a time, the appropriate transformation for the current set of pixels (e.g. based on the matrix multiplication described above) is first applied to the polygon to produce a new intermediate polygon which is rasterised for that set of pixels.

Further, though not necessarily an efficient approach, it is also possible to emulate the behaviour of this method by using multiple passes through the scene data with each pass using a differing transformation and using either stencil tests and/or clipping planes to limit rendering to the tile or tile-portions.

Whilst the graphics processing system and HDU is described above with reference to a HMD, the graphics processing system and HDU may alternatively be used for other types of projection systems, such as any type of projection system that comprises a lens that introduces some sort of distortion. Other examples include omnimax projection or fish-eye projection systems.

The graphics processing systems described herein may be embodied in hardware on an integrated circuit. The graphics processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics processing system configured to perform any of the methods described herein, or to manufacture a graphics processing system comprising any apparatus described herein. An integrated circuit definition dataset may be, for example, an integrated circuit description.

Therefore, there may be provided a method of manufacturing, at an integrated circuit manufacturing system, a graphics processing system as described herein. Furthermore, there may be provided an integrated circuit definition dataset that, when processed in an integrated circuit manufacturing system, causes the method of manufacturing a graphics processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing unit or system as described herein will now be described with respect to FIG. 8.

Figure 8:
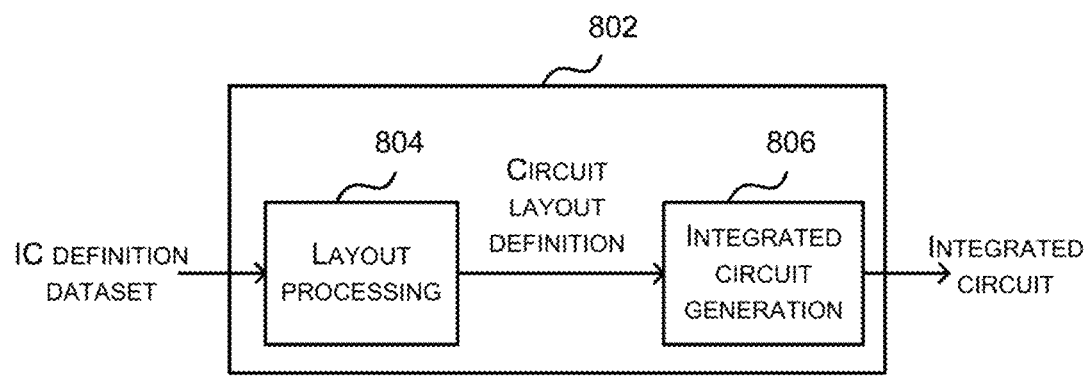
FIG. 8 shows an integrated circuit manufacturing system for generating an integrated circuit embodying a graphics processing unit or system, such as shown in FIGS. 4 and 5.

FIG. 8 shows an example of an integrated circuit (IC) manufacturing system 802 which is configured to manufacture a graphics processing unit or system as described in any of the examples herein. In particular, the IC manufacturing system 802 comprises a layout processing system 804 and an integrated circuit generation system 806. The IC manufacturing system 802 is configured to receive an IC definition dataset (e.g. defining a graphics processing system as described in any of the examples herein), process the IC definition dataset, and generate an IC according to the IC definition dataset (e.g. which embodies a graphics processing unit or system as described in any of the examples herein). The processing of the IC definition dataset configures the IC manufacturing system 802 to manufacture an integrated circuit embodying a graphics processing unit or system as described in any of the examples herein.

The layout processing system 804 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 804 has determined the circuit layout it may output a circuit layout definition to the IC generation system 806. A circuit layout definition may be, for example, a circuit layout description.

The IC generation system 806 generates an IC according to the circuit layout definition, as is known in the art. For example, the IC generation system 806 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 806 may be in the form of computer-readable code which the IC generation system 806 can use to form a suitable mask for use in generating an IC.

The different processes performed by the IC manufacturing system 802 may be implemented all in one location, e.g. by one party. Alternatively, the IC manufacturing system 802 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing unit or system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 8 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 8, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of rendering geometry of a 3D scene on a display, the method comprising:
   projecting geometry of the 3D scene into a 2D projection plane, wherein image regions are defined in the projection plane;
   defining a first set of transformations;
   adjusting the first set of transformations to produce a set of adjusted transformations;
   mapping the geometry from the projection plane into an image space using the set of adjusted transformations, wherein a respective adjusted transformation is defined for each image region; and
   rendering the geometry in the image space to determine image values of an image to be displayed on the display.

2. The method of claim 1, wherein the adjusted transformations are configured for mapping the geometry into the image space so as to counteract distortion.

3. The method of claim 2, wherein the distortion is introduced by an optical arrangement associated with the display.

4. The method of claim 1, wherein the adjusting provides motion compensation.

5. The method of claim 1, wherein the transformations are adjusted by combining each transformation in the first set of transformations with a global transformation.

6. The method of claim 1, wherein the image regions are tiles.

7. The method of claim 6, wherein the image regions in the projection plane are distorted tiles, and wherein the respective transformation for each of the image regions maps the image region to an undistorted tile in the image space.

8. The method of claim 1, wherein the image regions are half-tiles.

9. The method of claim 1, further comprising outputting the determined image values of the image to a frame buffer.

10. The method of claim 1, wherein projecting geometry of the 3D scene into said 2D projection plane comprises:
sub-dividing pixels in said image space into a plurality of image regions, each image region of said image space comprising a group of pixels.

11. The method of claim 1, wherein mapping the geometry from the projection plane into an image space using transformations comprises:
applying, for each vertex in an image region, a linear transformation to map the vertex position from the image space to said projection plane.

12. The method of claim 11, wherein applying, for each vertex in an image region, a linear transformation to map the vertex position from the image space to said projection plane comprises:
applying the linear transformation, for each vertex in an image region, to X and Y coordinates in the projection plane and leaving other vertex attributes unmodified.

13. A graphics processing system configured to render geometry of a 3D scene on a display, the graphics processing system comprising:
tiling logic arranged to project geometry of the 3D scene into a 2D projection plane, wherein image regions are defined in the projection plane; and
rendering logic arranged to map the geometry from the projection plane into an image space using transformations, wherein a respective transformation is defined for each image region so as to define a first set of transformations, adjust the first set of transformations to produce a set of adjusted transformations, wherein the geometry from the projection plane is mapped into said image space using the set of adjusted transformation, and render the geometry in the image space to determine image values of an image to be displayed on the display.

14. The graphics processing system of claim 13, wherein the transformations are configured for mapping the geometry into the image space so as to counteract distortion.

15. The graphics processing system of claim 14, wherein the distortion is introduced by an optical arrangement of the display.

16. The graphics processing system of claim 13, wherein the image regions defined in the projection plane are tiles, the image regions in the projection plane are distorted tiles, and wherein the respective transformation for each of the image regions maps the image region to an undistorted tile in the image space.

17. The graphics processing system of claim 13, further comprising a frame buffer and wherein the rendering logic is further arranged to output the determined image values of the image to the frame buffer.

18. The graphics processing system of claim 13, further comprising:
a memory arranged to store a plurality of transformation parameters defining the transformations, each transformation being a linear transformation and being associated with a group of pixels in said image space and defining a transformation of the pixels between image space and a projection plane.

19. A non-transitory computer readable storage medium having stored thereon a computer readable dataset description of a graphics processing system that, when processed in an integrated circuit manufacturing system, causes the integrated circuit manufacturing system to manufacture an integrated circuit embodying the graphics processing system, including:
tiling logic arranged to project geometry of the 3D scene into a 2D projection plane, wherein image regions are defined in the projection plane; and
rendering logic arranged to map the geometry from the projection plane into an image space using transformations, wherein a respective transformation is defined for each image region so as to define a first set of transformations, adjust the first set of transformations to produce a set of adjusted transformations, wherein the geometry from the projection plane is mapped into said image space using the set of adjusted transformation, and render the geometry in the image space to determine image values of an image to be displayed on the display.

* * * * *